(No Model.)
E. P. MONROE.
OIL CUP.
No. 283,914. Patented Aug. 28, 1883.
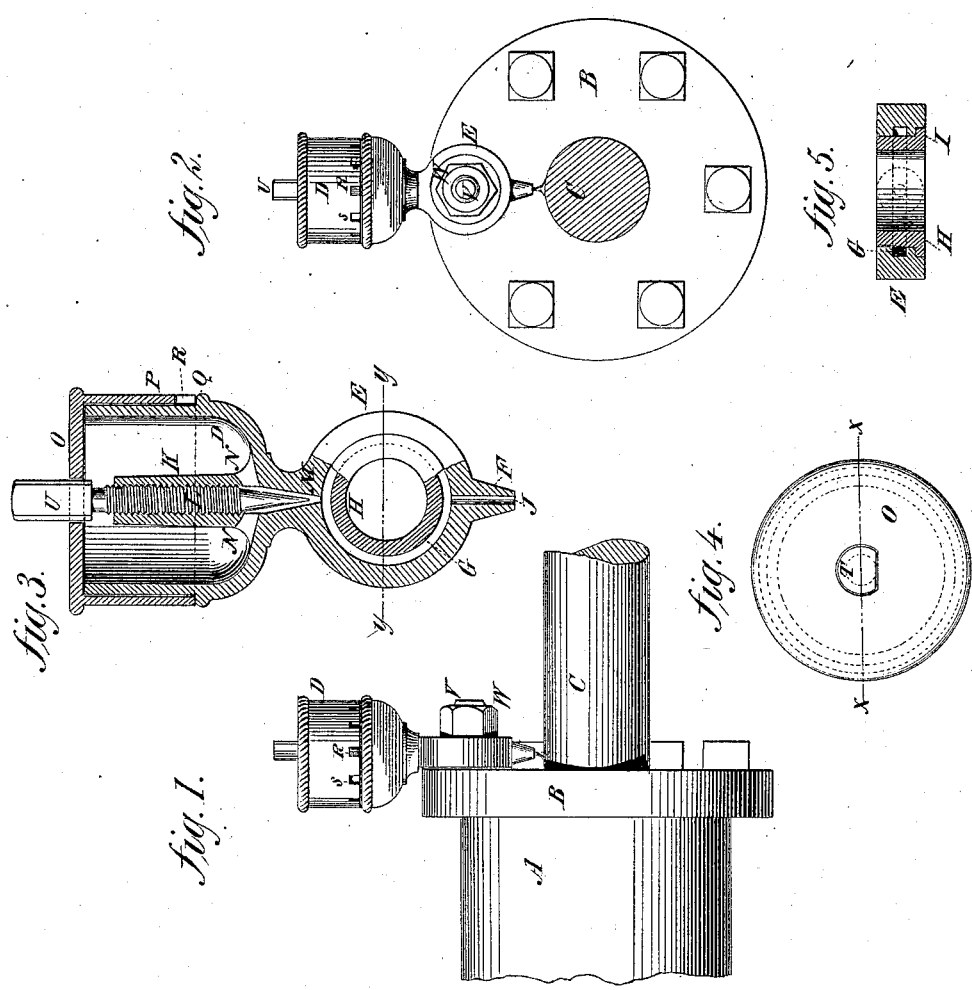
WITNESSES:
Gustave Dieterich
M. F. Burns
INVENTOR
Edwin Pear Monroe
BY Park Benjamin & Bro
ATTORNEYS

UNITED STATES PATENT OFFICE.

EDWIN PEAR MONROE, OF NEW YORK, N. Y., ASSIGNOR TO THE UNITED STATES METALLIC PACKING COMPANY, OF PHILADELPHIA, PA.

OIL-CUP.

SPECIFICATION forming part of Letters Patent No. 283,914, dated August 28, 1883.

Application filed January 17, 1883. (No model.)

*To all whom it may concern:*

Be it known that I, EDWIN PEAR MONROE, of the city, county, and State of New York, have invented a new and useful Improvement in Oil-Cups, of which the following is a specification.

The invention consists in an oil-cup adapted by its construction to be attached to the front of the cover of a stuffing-box and above the rod to be lubricated, which passes through said box, the said attachment being effected by one of the nuts and bolts whereby the stuffing-box cover is fastened in place.

The invention also consists in an improved construction whereby the escape-orifice for the oil can be opened or closed to any desired extent and so held, thus affording easy regulation of the outflow of oil.

In the accompanying drawings, Figure 1 is a side elevation of my device attached to the stuffing-box cover. Fig. 2 is a front elevation of the same, the rod to be lubricated being shown in cross-section. Fig. 3 is a vertical transverse section of the oil-cup on the line *x x* of Fig. 4. Fig. 4 is a plan view of said cup from above. Fig. 5 is a transverse section of the oil-duct on the line *y y* of Fig. 3.

Similar letters of reference indicate like parts.

A is the stuffing-box; B, the cover of same; and C is the rod to be oiled, said rod reciprocating in said stuffing-box.

The oil-cup consists of an upper chamber or vessel, D, provided with a prolongation, E, extending downwardly. The said prolongation is circular in form, and beneath it and formed upon it is a conical projection, F. The interior of the circular part E is cut out in circular form, and in the periphery thereof I form a groove or chamber, G. Into the circular opening of the projection E, I insert a hollow cylindrical plug, H, having a flange, I, which is received in a suitable circular recess, also formed at the edge of the inner periphery at the projection E. This plug is made to fit tightly, and is driven in through the circular aperture in the projection E. The channel G is thus converted into a duct, and into said channel the oil flows from the vessel D. The oil escapes from the channel G by the duct J in the projection F, and thence falls upon the rod C.

In the upper chamber, D, I form a vertical standard, K, the upper portion of which is screw-threaded internally to receive the screw-plug L, the conical point of which plug enters the duct M, which communicates with the channel G. The said duct M also communicates with the interior of the vessel D by two orifices, N N.

O is the cover of the oil-cup, provided with a deep circular flange, P, which comes in contact with the bead Q, surrounding the vessel D. On said bead, and upon the vessel D, I form a stop, R, adapted to enter any one of the slots S, made in the edge of the flange P. In the central part of the cover O, I make an aperture, T, of the form shown in plan, Fig. 4, and adapt it to receive the correspondingly-shaped head U of the screw-plug L.

V is one of the bolts whereby the cover B is secured to the box A, and W is a nut thereon.

To adjust the oil-cup in place, I remove the nut W and place the oil-cup over the bolt V, so that the latter passes through the central aperture of the projection E. I then place the nut on the bolt and set it up, thus clamping the oil-cup in place between said nut and the cover B. The oil then runs down from the stuffing-box directly upon the rod C, as shown in Fig. 2. By this arrangement I am enabled to place the oil-cup where it is easy of access, where its operation can be watched, and whence it can be easily removed when desired.

By raising or lowering the screw-plug L, it is obvious that the duct M will be more or less closed, and in this way the quantity of oil passing from the chamber D to the groove G, and thence upon the rod, may be regulated at will. In order to adjust said screw-plug L in any desired position, I make the head U thereof of the form shown. Said head cannot of course turn in the aperture T in the cover O. Consequently by rotating the cover O the screw-plug may be raised or lowered.

The object of the slots S in the cover-flange is to enable the cover, and consequently the screw-plug, to be held in place after adjustment, one of said slots S engaging with the stop R.

I have found the above arrangement in practice to be a very convenient one, especially as applied to locomotive-engines.

When the machine is idle, the attendant may entirely shut off the outflow of oil, and just before starting may provide for an outflow of oil in measured amount by an easy and simple adjustment of the oil-cup cover.

I claim as my invention—

1. The combination of an oil-cup and the projection formed thereon or attached thereto, the said projection having a channel for the outflow of oil from the cup, and containing an aperture to receive means whereby the cup is secured in place on a support, substantially as described.

2. The combination of an oil-cup and a support therefor, the said support being provided in its interior with a divided channel for the outflow of oil, and having between the branches of said channel an aperture to receive a bolt or equivalent means for holding the cup in place, substantially as described.

3. The combination, with an oil-cup, of a circular support or standard beneath said cup, having a central aperture containing a peripherical groove or channel and lined with a cylindrical plug, the said channel communicating with the interior of the oil-cup and with an exit-orifice, substantially as described.

4. The combination of an oil-cup and a circular support or standard beneath the same, divided with interior channels, as described, and a conical passage, forming a means of communication between the cup and the channels in the support, and a conical valve-plug having its seat in said passage, substantially as described.

5. In an oil-cup, the combination of the oil-vessel D, projection E, and plug H, substantially as described.

6. In an oil-cup, the combination of the oil-vessel D, cover O P, provided with a slot or slots, S, the stop R, the screw-plug L U, and the escape-apertures N M, substantially as described.

7. In an oil-cup, the combination of a conical escape-passage, a conical valve seated therein, the said valve having a screw-threaded stem contained in a suitable support inside the oil-cup, and a head or cap received and shouldered in an orifice in the cover of the cup, so that by rotating said cover the valve-stem may be turned, and the valve thereby raised or lowered in its seat, substantially as described.

8. In an oil-cup, the combination of a valve-stem, a cylindrically-flanged cover in which said stem is shouldered, a slot or slots formed in the lower edge of the cover-flange, and a stop adapted to be received in the cover slot or slots and arranged on the exterior of the oil-vessel, substantially as described.

EDWIN P. MONROE.

Witnesses:
PARK BENJAMIN,
M. F. BURNS.